I. MICHEL & R. STEIN.
MACHINE FOR AFFIXING STAMPS, LABELS, OR THE LIKE TO ENVELOPS OR THE LIKE.
APPLICATION FILED AUG. 24, 1910.

1,079,058.

Patented Nov. 18, 1913.

Witnesses
E. Schallinger
F. Stapel

Inventors
Isac Michel
Rudolf Stein
by B. Singer
Att'y

I. MICHEL & R. STEIN.
MACHINE FOR AFFIXING STAMPS, LABELS, OR THE LIKE TO ENVELOPS OR THE LIKE.
APPLICATION FILED AUG. 24, 1910.

1,079,058.

Patented Nov. 18, 1913.
10 SHEETS—SHEET 4.

Witnesses
E. Schallinge
F. Stapel.

Inventors
Isac Michel
Rudolf Stein
by B. Singer
Atty

COLUMBIA PLANOGRAPH CO., WASHINGTON, D. C.

I. MICHEL & R. STEIN.
MACHINE FOR AFFIXING STAMPS, LABELS, OR THE LIKE TO ENVELOPS OR THE LIKE.
APPLICATION FILED AUG. 24, 1910.

1,079,058.

Patented Nov. 18, 1913.
10 SHEETS—SHEET 6.

Witnesses
E. Schallinger
F. Stapel

Inventors
Isac Michel
Rudolf Stein
by B. Singer
Att'y

I. MICHEL & R. STEIN.
MACHINE FOR AFFIXING STAMPS, LABELS, OR THE LIKE TO ENVELOPS OR THE LIKE.
APPLICATION FILED AUG. 24, 1910.

1,079,058.

Patented Nov. 18, 1913.

Witnesses
E. Schallinger
F. Stapel

Inventors
Isac Michel
Rudolf Stein
by B. Singer
Att'y

I. MICHEL & R. STEIN.
MACHINE FOR AFFIXING STAMPS, LABELS, OR THE LIKE TO ENVELOPS OR THE LIKE.
APPLICATION FILED AUG. 24, 1910.

1,079,058.

Patented Nov. 18, 1913.

Witnesses
E. Schallinger
F. Stapel

Inventors
Isac Michel
Rudolf Stein
by B. Singer
atty

I. MICHEL & R. STEIN.
MACHINE FOR AFFIXING STAMPS, LABELS, OR THE LIKE TO ENVELOPS OR THE LIKE.
APPLICATION FILED AUG. 24, 1910.

1,079,058.

Patented Nov. 18, 1913.
10 SHEETS—SHEET 9.

Witnesses
E. Schallinger
F. Stapel

Inventors
Isac Michel
Rudolf Stein
by B. Singer
Att'y

I. MICHEL & R. STEIN.
MACHINE FOR AFFIXING STAMPS, LABELS, OR THE LIKE TO ENVELOPS OR THE LIKE.
APPLICATION FILED AUG. 24, 1910.

1,079,058.

Patented Nov. 18, 1913.
10 SHEETS—SHEET 10.

Witnesses
E. Schallinger
F. Stapel

Inventors
Isac Michel
Rudolf Stein
by B. Singer
Atty

UNITED STATES PATENT OFFICE.

ISAC MICHEL AND RUDOLF STEIN, OF FRANKFORT-ON-THE-MAIN, GERMANY.

MACHINE FOR AFFIXING STAMPS, LABELS, OR THE LIKE TO ENVELOPS OR THE LIKE.

1,079,058.

Specification of Letters Patent.   Patented Nov. 18, 1913.

Application filed August 24, 1910. Serial No. 578,621.

*To all whom it may concern:*

Be it known that we, ISAC MICHEL and RUDOLF STEIN, subjects of the Emperor of Germany, and residing at 23 Friedbergerstrasse, Frankfort-on-the-Main, Germany, have invented a certain new and useful Improvement in Machines for Affixing Stamps, Labels, or the like to Envelops or the like, of which the following is a specification.
This invention has for its object to provide a machine of improved construction for affixing separable sections of strips of paper or the like such as postage stamps, labels or the like to envelops or the like;
the improved machine is adapted to register the number of sections or units affixed and is also provided with devices for preventing unauthorized removal of stamps or the like.
One construction of machine embodying the invention is illustrated in the drawing in Figures 1 to 13.
Figs. 11 and 12 show a construction of the spools for the strips, Fig. 11 being a section on the line O—P of Fig. 12, and Fig. 12 a section on the line Q—R of Fig. 11.
Figs. 14 and 15 show a moistening device in side and rear elevation respectively.
Figs. 19 and 20 show an automatic device for closing the aperture for admission of envelops or the like.

Referring to the drawing, the shaft 2 mounted in the machine casing 1 and provided with a hand lever 3 carries a number of cam disks, which are engaged by levers 70 freely mounted upon a shaft 4 also carried in the machine casing 1.

Figures 4, 8, 9, 10:
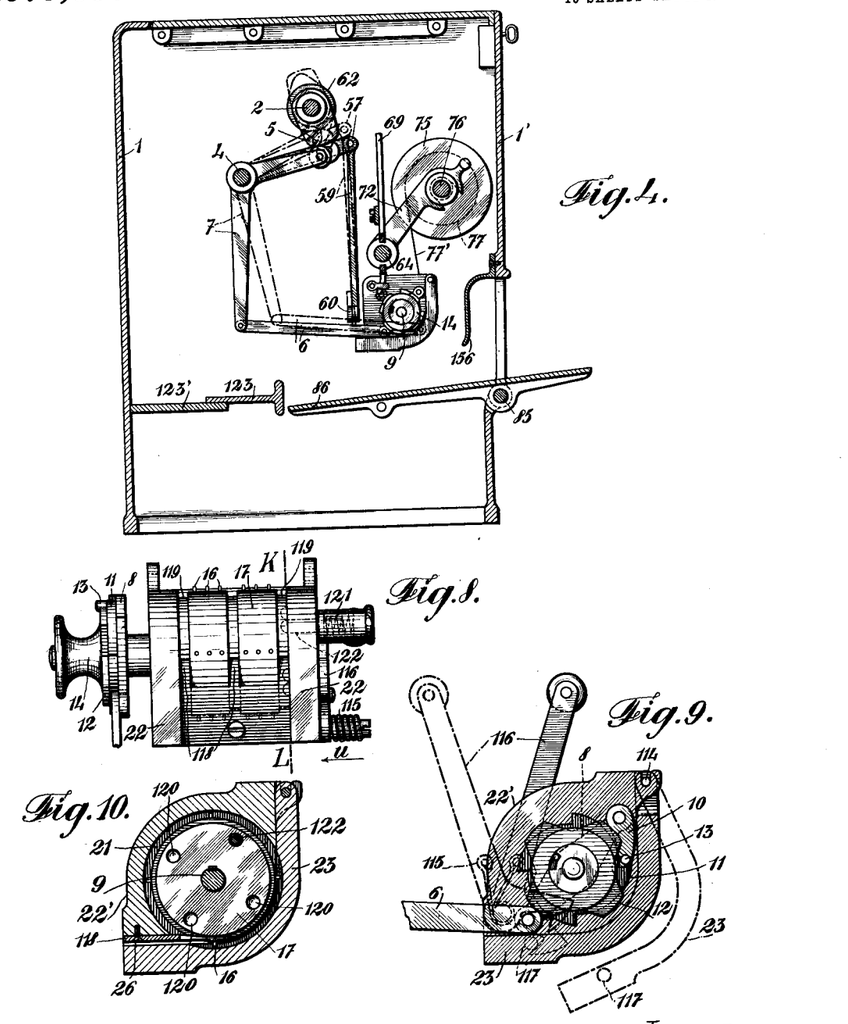
Fig. 4 is a section also on the line C—D of Fig. 1 with a number of parts removed.
Figs. 8 to 10 show a construction of the feed rollers for the strips, Fig. 8 being a front elevation, Fig. 9 a side elevation, and Fig. 10 a section on the line K—L of Fig. 8, looking in the direction *u*.
Figure 22:
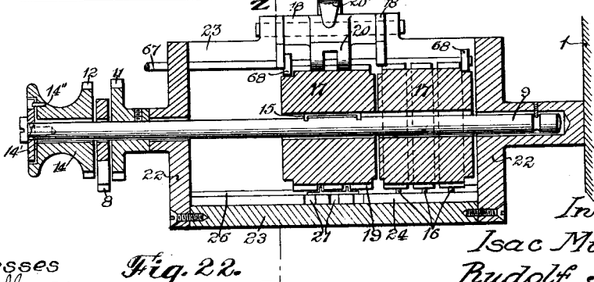
Fig. 22 is a sectional view showing the coupling of the shaft for the feeding rollers, and the casing for said rollers; the rollers being shown in their extreme right hand position, so that the left hand roller is in operative position.

A bell crank lever 7 is pressed against the disk 5 by means of a spring, not shown. The bell crank lever is pivotally connected with the rocking pawl 8 by means of a rod 6, the pawl being loosely mounted on shaft 9, which is rotatably secured in the casing of the machine, (Fig. 22). The pawl 8 carries a dog 10 which enters into engagement with the feeding wheel 11 secured on the shaft 9. A knob 14 is loosely mounted at the free end of the shaft 9 and this knob may be rigidly connected with said shaft by means of a pin and a slot. For this purpose a disk 14′ is secured to the square end of shaft 9 and is provided with a slot through which projects a pin 14² fastened on the knob 14. The knob is provided with lugs 12. When the knob is rotated, the lugs raise the dog 10 by means of pin 13, so that said dog will be disengaged from the feed wheel 11. By this means shaft 9 may be rotated in either direction by rotation of the knob 14, the pin 14′ entering the slot whenever the dog is lifted out of engagement with the feed wheel. A feed roller 17 provided with pins or pegs 16 is also mounted upon the shaft 9. This roller is inclosed by a casing which consists of two cheeks 22, fixed to the machine frame and connected with each other by means of a transverse wall 22′, and of a guide portion 23 which is removably secured at 114. The guide 23 surrounds the roller for about one half of its circumference and is held in the position shown by full lines in Figs. 9 and 10 by means of a lever 116 engaging under the action of a spring 115 a projection 117 on the guide 23. In this position a narrow passage 26 is left for the strip. Fingers 118 entering grooves 119 in the feed roller 17 serve to separate the strip from the roller. The latter is provided on one side with sockets 120, which are engaged upon rotation of the roller by a dowel pin 122 (Figs. 8 and 10) carried on a lug 121 on the casing, thereby determining the exact position of the roller 17 corresponding to the length of a section of the strip. The casing 22' and the guide 23 are provided with grooves 21 into which the pegs 16 project.

If the machine is to be used for affixing different kinds of strips, for instance stamps of different value, the machine is provided with a corresponding number of feed rollers. The latter are in this case mounted upon the shaft 9 in such manner that they may be shifted in axial direction. Such an arrangement is shown by way of example with two rollers in Fig. 1. The casing 22, 22', 23, is so arranged that the feed rollers may be shifted within the same. According to the position of the rollers (Fig. 1, dotted on the right hand side and chain-dotted on the left hand side) one or other of the two rollers is coupled with the shaft 9 by a feather 15. That roller which is out of use at the time, is prevented from rotation by means of an arm 18 mounted in the machine frame and engaging axial grooves on the roller, the pegs 16 of the roller projecting into grooves 21 of the casing 22. In the shifting movement of the rollers 17 the fingers 118 slide in grooves 19, which extend longitudinally on the circumference of the roller, the depth of the grooves 19 being equal to the depth of the circumferential grooves 119.

From Fig. 22 it will be seen that the bifurcated arm 18 does not prevent the left hand roller 17, which is rigidly connected with the shaft 9 by means of the key 15, from rotating with the shaft, the right hand roller 17, however, is in engagement with the arm 18, as may be clearly seen from the drawing.

Figure 1:
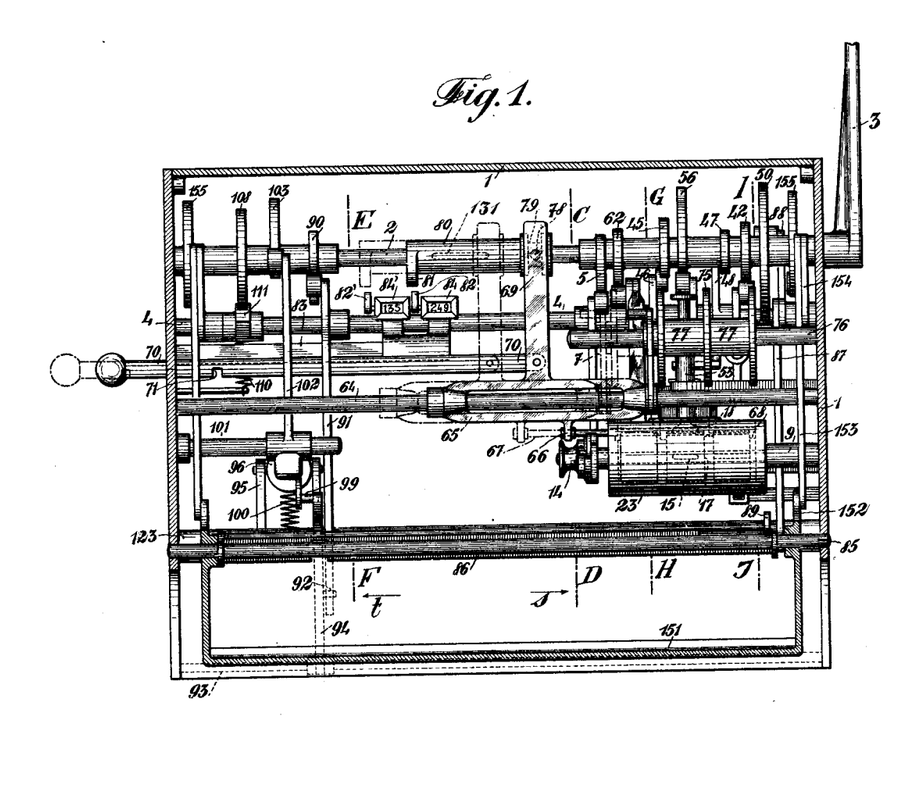
Fig. 1 is a longitudinal section on the line A—B of Fig. 2.
Figure 2:
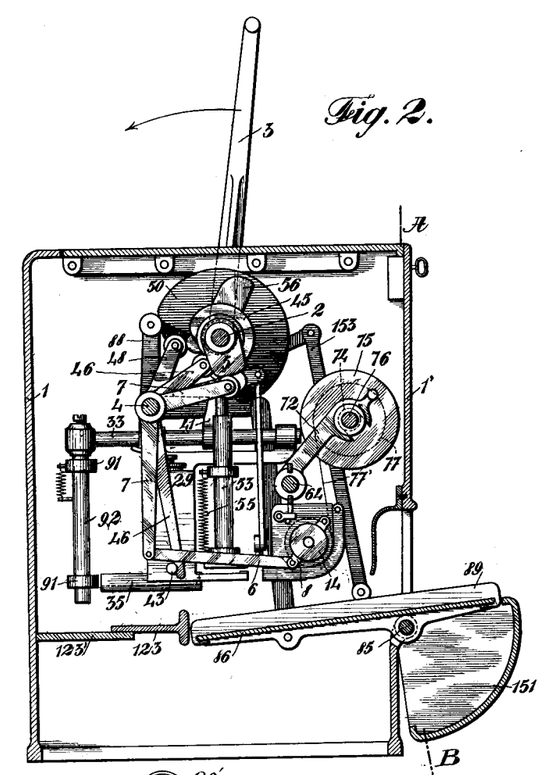
Fig. 2 is a cross section on the line C—D of Fig. 1 looking in the direction *s*.
Figure 5:
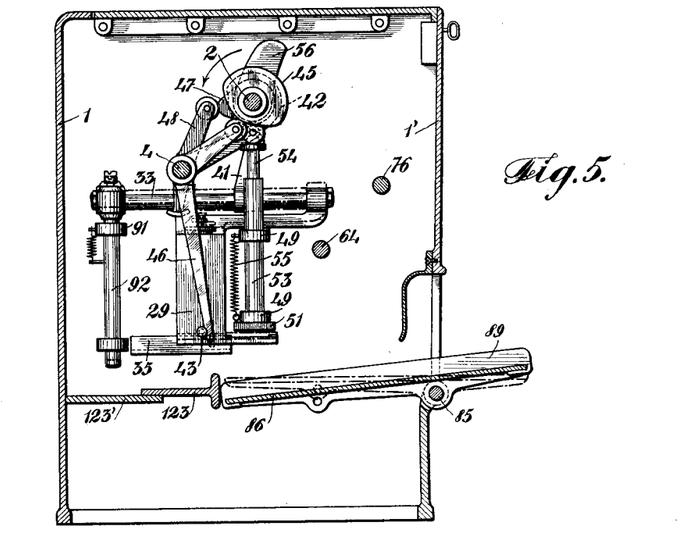
Fig. 5 is a cross section on the line G—H of Fig. 1, with a number of parts removed.
Figure 6:
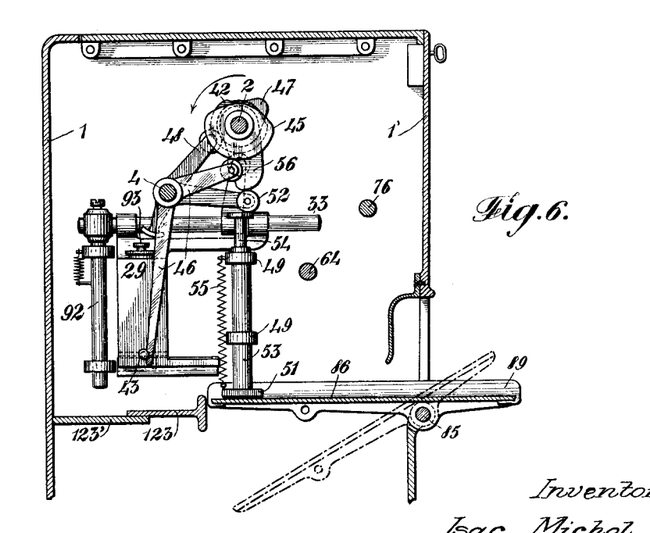
Fig. 6 is a section corresponding to Fig. 5 but representing various parts in a different operative position.
Figure 14:
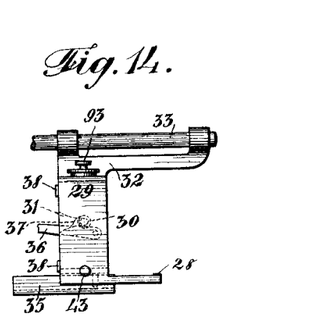
Figure 15:
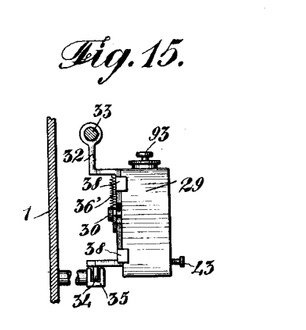

Opposite the opening of the passage formed by the casing 22, 22', is arranged a box 29 containing a moistening pad 28 (Figs. 1, 2, 5, 6, 14 and 15.) The box or container 29 is suspended by means of a pin 30 engaging a socket 31 in a bracket frame 32. (Figs. 14 and 15.) This frame is guided on the one hand by the rod 33 and on the other hand by a projection 34 engaging a groove 35 in the machine casing (Figs. 2, 5, 6, 14 and 15.) The vertical position of the moistener container is insured by means of two lugs 38 and a hand lever 36, a projection 37 of which engages the pin 30 in its locking position under the influence of the spring 36' connected to the hand lever. The rod 33 is carried by a shaft 92 vertically movable in eyes 91 on the machine casing (Figs. 2, 5, 6.) The rod 33 is provided with an arm 41 which is pressed against the cam disk 42 of the shaft 2 by means of a spring (Figs. 5 and 6). A bell-crank lever 46 actuated by means of a cam disk 45 on the shaft 2 is pressed against a projection 43 on the container by means of a spring, not shown. The moistener container is provided on its upper side with a valve 93 which is normally closed by a spring and is opened on being depressed by means of a double-armed lever 48 actuated by a cam disk 47 on the shaft 2. An arrangement may be provided whereby the valve may be operated by hand by means of a button or handle projecting through the walls of the machine casing. This is of advantage should the liquid dry up slightly, as by the admission of air the moistener may be readily brought into operation again.

A plunger is slidably mounted within guides 49 in the machine frame 1 (Figs. 2, 5 and 6), said plunger consisting of a foot plate 51 provided with a yielding covering, a cylinder 53 connected thereto and a cylinder 54 telescoping in the cylinder 53. A spring 55 tends to keep the plunger in its highest position shown in Figs. 2 and 5; a spring, not shown, is arranged in the cylinder 53 and tends to keep the inner cylinder 54 against the cam disk 56 on the shaft 2 through the intermediary of the lever 52 on the shaft 4 (Fig. 6.)

Figure 13:
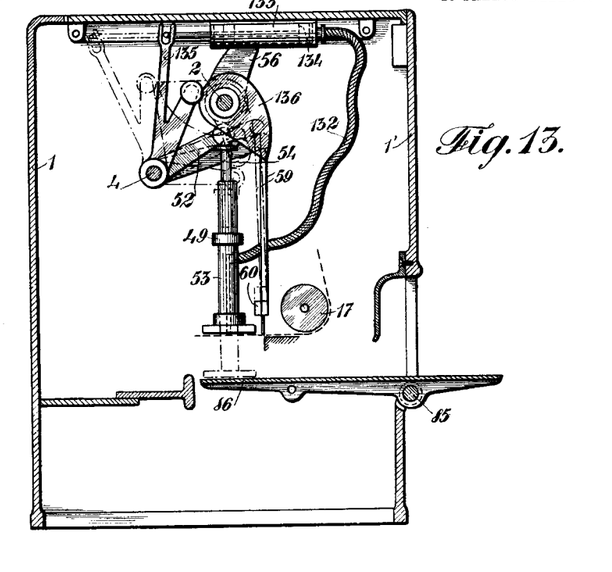
Fig. 13 shows a plunger with a pneumatic suction device.

By means of a flexible connection 132 (Fig. 13) the plunger is connected with an air pump 133, the piston 134 of which is actuated by means of a cam disk 136 on the shaft 2 through the intermediary of a bell-crank lever 135. The cam disk 136 is so set relatively to the cam disk 62 (Fig. 4) operating a knife 60 that the piston 134 begins its movement toward the left according to Fig. 13, that is, it produces a partial vacuum at the foot of the plunger, before the knife 60 has descended to sever a section of the strip. The knife blade 60 is disposed immediately in front of the opening of the passage 26 in the casing 22, 23, between the casing or the plunger foot and the container 29; said knife 60 being operated by connections 57, 59. The lever 57 which is freely mounted on the shaft 4 (Fig. 4) is pressed against the cam disk 62 on the shaft 2, said cam disk effecting the reciprocation of the knife blade.

Figure 7:
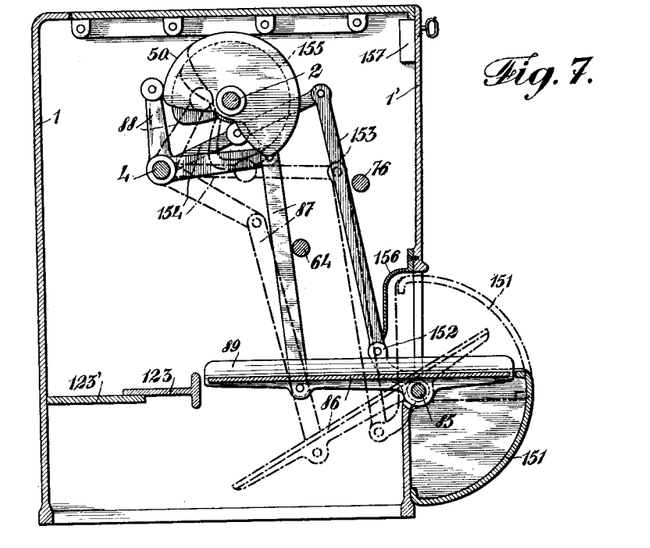
Fig. 7 is a cross section on the line I—J of Fig. 1.

A cam 50 on the shaft 2 (Fig. 7) imparts movement to a bell-crank lever 88 pressed against said cam by a spring and mounted on the shaft 4, said bell-crank lever being connected by means of a link 87 with a tilting table 86 pivoted at 85 on the machine casing. The table 86 is provided with a guiding bar 89 adjustable in the direction of the axis 85 (Figs. 2 and 7). Opposite the table is disposed a stop bar 123 extending parallel to the tilting axis of the table and arranged adjustably upon a projecting ledge 123' on the machine casing.

Figure 11:
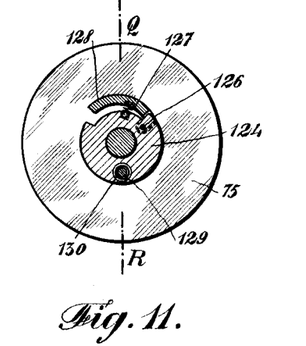
Figure 12:
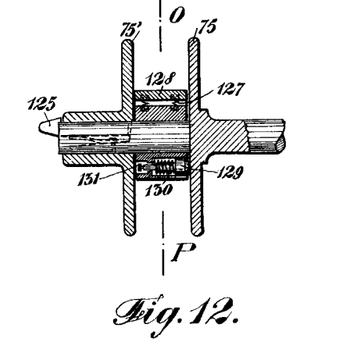

If the machine is provided with one feed roller only, a spool 124 as shown in Figs. 11 and 12, serves to carry the rolled up strip of stamps or the like. This spool 124 is rotatable on a shaft 76 (Fig. 1) mounted in the machine casing 1 and is interposed between two flanges 75, 75' on said shaft, the flange 75' being held on the shaft 76 in the position shown in Fig. 12 by means of a spring catch 125. In the position shown the flange 75' serves in conjunction with the flange 75 to guide the rolled up strip. The spool 124 is provided with a segment 128 connected thereto by a pivot 126, springs 127 tending to keep the segment in the extended position shown, which segment is thus pressed against the inner circumference of the roll and prevents any sliding of the latter relatively to the spool. The spool is also provided with a bolt 129 which is pressed against the flange 75 by means of a helical spring 130 and is secured from falling out accidentally by means of a small screw 131. This bolt produces friction upon the spool on its rotation so that a certain resistance is offered to rotary movement of the spool.

If a set of axially slidable feed rollers be provided, a corresponding set of slidable spools is also provided. Such an arrangement is shown in Fig. 1.

Figures 3, 16:
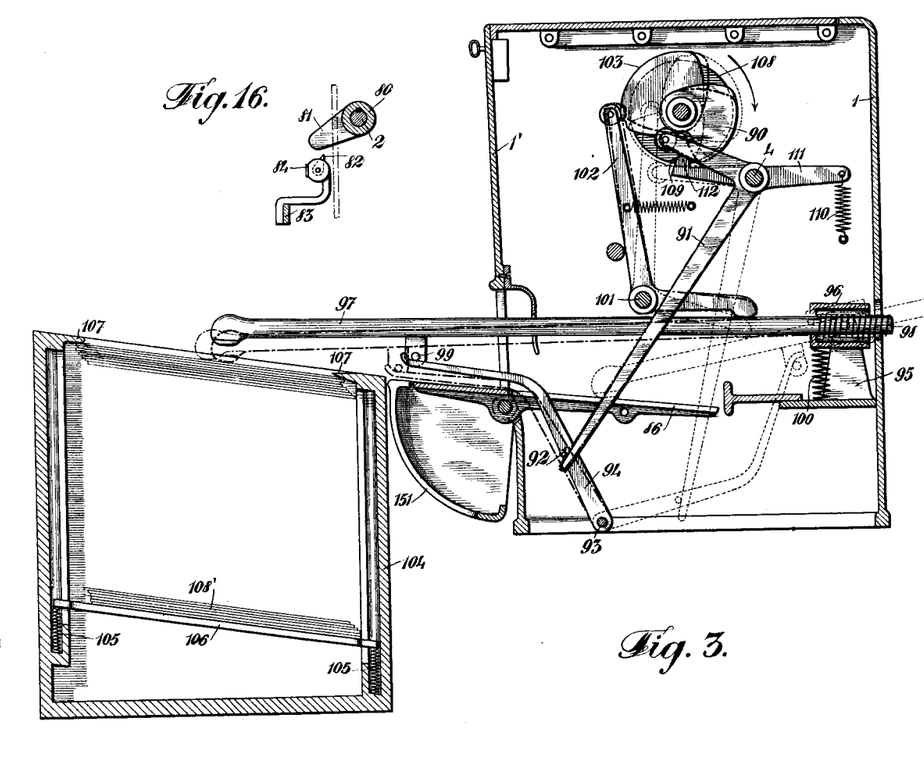
Fig. 3 is a cross section on the line E—F of Fig. 1, looking in the direction *t*.
Fig. 16 is a detail of a counter.
Figure 23:
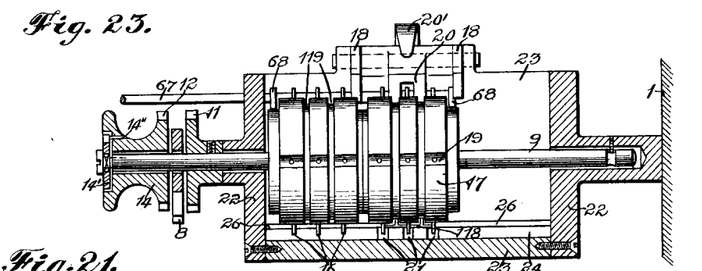
Fig. 23 is a sectional view partly in elevation similar to Fig. 22. The rollers are shown in their extreme left hand position, so that the right hand roller is in operative position.
Figure 24:
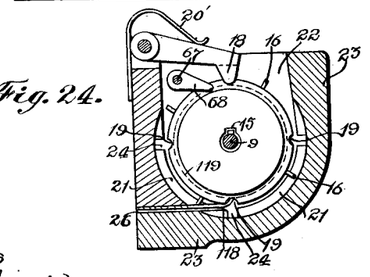
Fig. 24 is a section on Z—Z of Fig. 22.

A sleeve 65 is axially slidable upon a shaft 64 in the machine casing, an arm 66 on said sleeve carrying a slide rod 67 (Figs. 22 and 24.) The rod 67 has two projections 68 which engage between them the rollers 17 and, upon the sliding movement of the sleeve, shift the rollers into one or other of the positions indicated in Figs. 1, 24 and 23. To an arm 69 on the sleeve 65 is pivotally connected a rod 70 (Fig. 1) which is provided with two notches 71 by means of which it can be engaged with the wall of the machine casing, thus securing the sleeve 65 in either of its extreme positions. An arm 72 is pivotally connected to the sleeve (Figs. 2 and 4), said arm engaging a groove 74 in the spool casing. The spools are axially slidable upon the shaft 76, and each of them carries a rolled strip 77 of perforated paper or the like. A pin 78 on the arm 69 engages a groove 79 in a sleeve 80 provided with a cam disk 81 and slidably mounted upon the main shaft 2 (Fig. 1). The sleeve 80 is coupled with the shaft 2 by means of a slot and feather 137. According to the position of the sleeve 65 the cam disk 81 imparts oscillation by its rotating movement to an arm 82 or 82' which actuates the counter 84 or 84' mounted upon a bar 83 in the machine casing (Figs. 1 and 16). A notched disk 108 (Fig. 1 on the left hand side) also rotates with the shaft 2, the notch 109 of which disk, (Fig. 3) upon rotation thereof, is engaged by a correspondingly shaped head of a double-armed lever 111 actuated by a spring 110. The operator can thus tell when the hand lever 3 has made one complete rotation and has returned to initial position.

The said devices coöperate with each other in the manner now to be described; a machine containing several kinds of strips being considered by way of example. If, for instance, the machine is to be used for affixing stamps on envelops, the machine is arranged to hold strips or stamps of the different values most frequently in use. At first, after the removal of the guiding portion 23, the perforated strips 77' (Figs. 2 and 4) are attached to the roller 17 by placing the first line of perforations onto the pegs 16 of said roller, then the guide 23 is replaced and secured in position by means of the lever 116 so that the end of the strip is now located in the narrow guiding passage 26 and is secured against slipping off the roller. Thereupon the rolls 77 and the feed rollers 17 are brought into the extreme left or right hand position indicated in Fig. 1 by sliding the sleeve 65 by means of the rod 70, in which position one of the rollers is coupled with the shaft 9 and through the latter with the actuating device 5, 6, 7, 8, 10 according to whether the right or left hand strip is to be used. By the movement of the sleeve 65 and through the intermediary of the arm 69 thereon the sleeve 80 is also shifted so that the counter-actuating device is in gear with the counter for the corresponding strip. It is of course understood that any larger number of strips may also be employed; or, as already described, a single strip may be provided.

After the strips are secured in the manner described, the spool carrying the strip to be used is turned by means of the knob 14 on the shaft 9 (Figs. 1, 8 and 9) until the first section of the strip is about to leave the passage 26 between the corresponding feed roller and the casing, while the other roller or rollers is or are prevented from rotation by means of the arm 18 which is controlled by a spring 20' mounted on the casing. These arms 18 are clearly shown in Figs. 22 and 24 and are provided with a finger projecting downwardly so as to hold the roller 17 underneath said arms from rotation by projecting yieldingly into one of the grooves 19 on the rollers. The adjustment is facilitated by the pin 122 engaging recesses 120 in the roller, the distances between said recesses corresponding to the length of a section of the strip.

In the position of the hand lever 3 shown in Fig. 2 with the machine at rest, as is recognized by the lever 111 (Fig. 3) engaging the notch 109 of the disk 108, the moistener 29 (Fig. 2) is disposed a little below the plunger 51, 53. If the lever 3 be turned in counter-clockwise direction, the strip of stamps is first advanced to the extent of the length of one stamp by means of the gears 5, 6, 7, 8, 10 and 11, so that one stamp is passed into the space between the moistener and plunger, whereupon the moistener is allowed to rise by the members 41, 42 until it touches the plunger 51 or a stamp disposed below the latter (Fig. 5); thereupon the moistener is withdrawn from below the stamp by means of the members 46 and 45 (Fig. 6), the moistener being guided by the members 33, 35. If the section of the strip is not already provided with adhesive material, the container 29 is filled with adhesive instead of moistening liquid. When the moistener passes over the section of the strip of stamps or the like, the valve 93 is depressed through the intermediary of the lever 48 and the cam disk 47, air being thus admitted to the container at every moistening operation. Should the moistener fail, for instance, for the reason that on starting the machine the moistening pad is in a dry condition, air may be supplied by hand. During the further rotation of the handle 3 the air pump 133, 134 (Fig. 13) comes into operation and causes the stamp to adhere to the plunger so that it cannot fall off after the knife 60 actuated by the members 62, 57, 59, has severed a stamp or the like from the strip 77'. Thereupon the cam disk 56 causes the descent of the plunger which is now entirely cleared by the moistener. The foot plate 51 of the plunger presses the moistened stamp upon the envelop which has in the meantime been placed against the bars 89, 123 either by hand or by means of automatic feeding devices described below. If the distance of the stop bar 123 from the table 86 and also the position of the guide bar 89 upon the table be correctly adjusted, the stamp will always be affixed in the same position upon the envelop or the like. While the stamp is being applied, the air pump 133, the piston 134 of which moves now in the direction toward the right, Fig. 13, produces compression of air at the foot of the plunger, whereby the stamp which might tend to adhere to the foot plate for instance is released therefrom. Hereupon the plunger and thereafter also the moistener return to initial position, Fig. 2, while the table 86 is tilted by the members 87, 88 and 50 so that the stamped envelop is dropped into a receptacle located beneath the machine. If another strip of stamps is to be used it suffices to shift the sleeve 65 by means of the rod 70 into the other extreme position, or, with an arrangement of more than two strips, into an intermediate position, whereby a new strip and a corresponding counter are at once brought into operation.

In order to prevent unauthorized removal of the stamps from the machine as for instance by affixing them to a sheet of paper which might be removed from the table after a stamp has been affixed and before the table is tilted to deliver the sheet into a locker or receptacle below, the machine is provided with a device which renders the withdrawal of an article impossible after a stamp has been affixed thereto. This device consists mainly of a guard or shutter which closes the aperture for the introduction of envelops or the like before the stamp is affixed thereto and opens said aperture again only after the stamped envelop is delivered into the locker or receptacle below the machine. The table is provided with strikers or fingers which insure that the envelop shall be passed from the table even should it tend to adhere thereto owing to moisture or for other reasons. Further, the device is arranged in such manner that in those cases where several stamps are to be fixed side by side upon the same envelop, the guard remains in the closed position and the tilting table in the horizontal position until the desired number of stamps have been affixed to the envelop and the latter has been discharged from the table. This device is shown in Figs. 17 to 21.

A quadrant-shaped guard or shutter 151 is pivoted on the tilting axis 85 of the table 86 (Figs. 1, 2, 3, 7, 17, 19) said guard being connected by means of the arms 152 and the rods 153, Fig. 7, with the lever 154 pivotally mounted on the shaft 4. The lever 154 is continuously pressed against the cam disk 155 rotating with the shaft 2, by means of a spring, not shown. A screen 156 fixed to the front wall of the casing prevents access to the casing 22, 23 containing the stamps or the like, thus preventing unauthorized removal of the stamps in this manner. Preferably, the front wall 1' of the casing is removable, Fig. 7, and adapted to be secured in place by means of a lock 157 or in any other manner so that the casing may be opened to give access to the operative parts of the machine or to permit replacing of strips by authorized persons.

Figure 17:
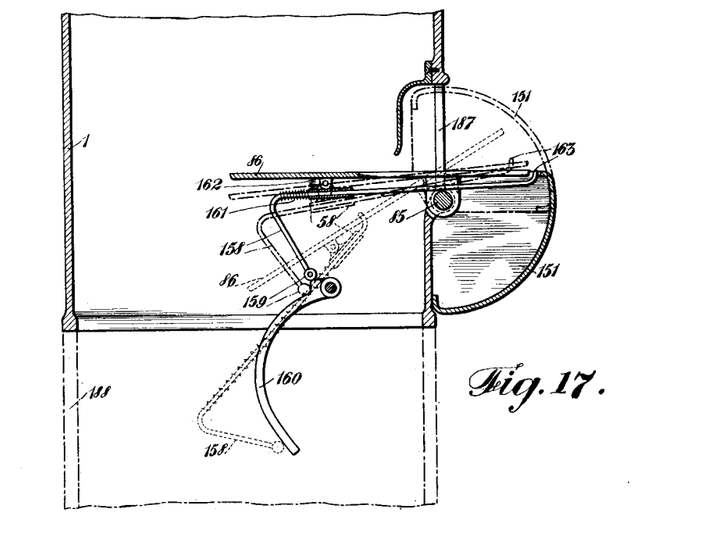
Figs. 17 and 18 show a device for automatically delivering envelops or the like, in side and front elevation.
Figure 18:
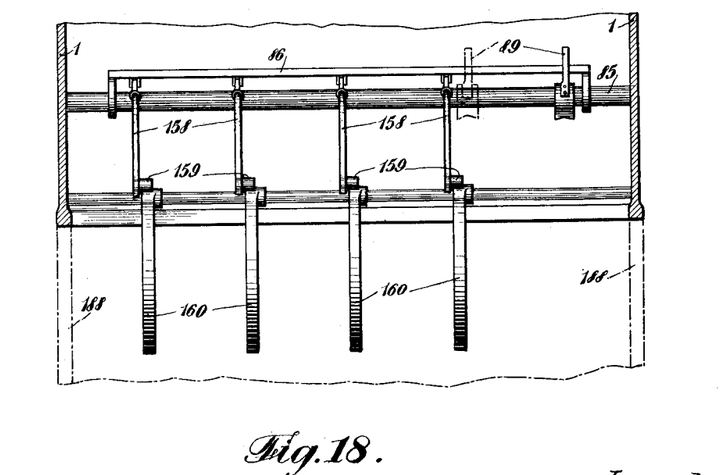

The table 86 carries on its underside in guides 58, Figs. 17 and 18, pivoted thereto, fingers 158, the hooked ends of which are each provided with a roller 159 guided upon a cam 160 fixed in the machine casing 1. A spring 161 tends to move the fingers to the left in Fig. 17, and another spring 162 tends to turn said fingers in counter-clockwise direction. In the position of rest of the fingers shown in Fig. 17 the up-turned right hand ends 163 are disposed slightly below the surface of the table or flush therewith: if the table 86 is tilted, the cam 160 causes the fingers 158 to be moved relatively to the table and transversely to its tilting axis against the action of the spring 161, the cam 160 being so shaped that the upper ends of the fingers project beyond the surface of the table.

Figure 19:
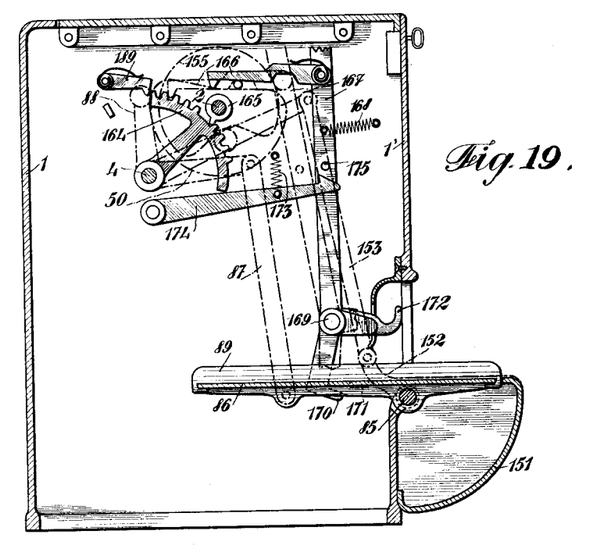
Figure 20:
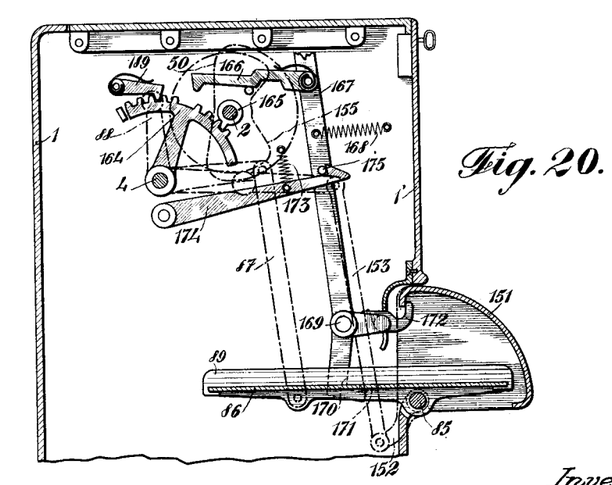

A toothed sector or quadrant 164 is freely mounted on the shaft 4, Figs. 19 and 20, a wheel 165 rotatable on the shaft 2 and having one tooth and a pawl 166 on a lever 167 being adapted to engage said quadrant. A spring 168 tends to draw the lever 167 into the full-line position shown in Fig. 19, said lever being pivotally mounted at 169 and terminating in a head 170, which, on movement of the lever toward the left enters under a projection 171 of the table and thus keeps the latter in horizontal position. The lever 167 carries resiliently a hook 172 which engages the guard 151 when the lever is in a corresponding position. A catch 174 actuated by a spring 173 prevents the complete return of the lever 167 to initial position (full line position, Fig. 19) by engaging a pin 175 on said lever when the lever has once been moved toward the left from this position.

The guide bar 89 (Fig. 21) which is adapted to be adjusted in the direction of the tilting axis of the table 86 is connected by means of a distance piece 176 with a toothed rod 177 which is engaged by a pawl 178. This pawl is actuated by means of members 179, 180, 181, 182, 183, 184 and a cam disk 185 on the crank shaft 2. A spring 186 retains the rod 177 in its different positions.

Figure 21:
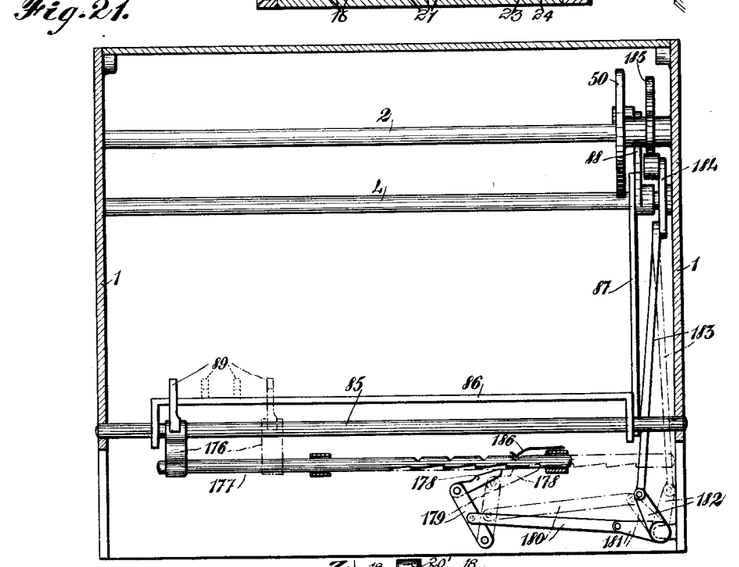
Fig. 21 shows a device for automatically adjusting a bar for guiding the articles to which stamps or the like are to be affixed.

The operation of these devices is as follows:—If it is desired, as is generally the case, to affix only a single stamp or the like upon the envelop or similar article, the guide bar 89 will be disposed in the chain-dotted position shown in Figs. 18 and 21. The members 178 to 185 work at first without effect. At the beginning of each rotation of the handle the table 86 is in the horizontal position, the fingers 158 are somewhat lowered relatively thereto and the guard 151 is in the position shown in Figs. 17 and 19. Shortly before the stamp is applied to the envelop, the guard 151 rises (chain dotted position Fig. 17) and closes the aperture 187. After the stamp has been affixed, the table 86 begins its tilting movement and the fingers 158, after having risen above the table surface, begin their sliding movement relatively to the table, thus forcibly removing the envelop. Normally the tilting of the table will be sufficient to cause the envelop or the like to drop into the locker or receptacle 188 which is disposed beneath the table. The fingers insure the removal of the envelop from the table even in case moisture or adhesive substance, transferred by the moistener to the table, should tend to cause the adhesion of the envelop to the table, which would otherwise permit the withdrawal of the envelop after the stamp has been affixed. After the stamped envelop has been delivered by means of the fingers 158 into the receptacle 188, the guard 151 returns to initial position (full lines, Fig. 17) and leaves the aperture 187 open for other envelops to be admitted.

Under normal conditions the aperture 187 is cleared each time after a stamp is affixed. If an unauthorized removal of stamps from the machine is to be effectually prevented, it is necessary, in case a number of stamps is to be affixed side by side on the same envelop, to provide that the opening shall remain closed until the envelop is dropped into the receptacle. To this end, the toothed quadrant 164 is advanced toward the left in Figs. 19 and 20 by means of the hand lever 167 to the extent of as many teeth as stamps of the same kind are to be affixed to the envelop. As each stroke of the lever 167 advances the toothed quadrant by means of the pawl 166 (chain-dotted position, Fig. 19) to the extent of one tooth—a detent 189 preventing the return of the quadrant on the backward movement of the lever 167—the lever must be moved as many times as there are stamps to be affixed. Once the lever is moved, the catch 174 (Fig. 20) prevents its complete return to initial position. Consequently, the lever, after being released, is brought by means of the spring 168 into a position in which its end 170 engages a projection 171 on the tilting table; the cam disk actuating the latter can still rotate freely but the table cannot tilt any more by its own weight. At the beginning of the operation the table is therefore in horizontal position and the envelop is placed upon it in the usual manner, after the guide bar 89 has been adjusted at a distance from its normal position, shown chain-dotted in Figs. 18 and 21, to a position corresponding to the number of stamps to be affixed. By rotation of the crank 3 the guard 151 is turned into closing position before the stamp is affixed, but is now prevented from returning by engagement with a resilient hook 172 (Fig. 20). The cam disk 155 for the actuation of the guard (Fig. 7) continues its rotation without further effect. On each rotation of the crank handle the wheel 165 (Figs. 19 and 20) turns the quadrant 164 backward to the extent of one tooth; shortly before the completion of the rotation the bar 89 is shifted toward the right by means of the members 176 to 185 to the extent of the breadth of one stamp. If, for instance, the quadrant 164 is shifted to the extent of three teeth toward the left for the purpose of attaching three stamps side by side, the quadrant comes into engagement with the pawl 174 after three rotations of the crank shaft, i. e., after affixing three stamps; said pawl 174 is thereby depressed and releases the pin 175 of the lever 167 which returns into the position indicated in full lines in Fig. 19 thereby releasing the table 86 and the guard 151. The wheel 165 and the cam disks actuating the table and the guard are so disposed relatively to each other that the cam disks come into operation immediately after the table and the guard are released, the table then performing its tilting movement and the fingers 158 coming into action, while the aperture 187 is again cleared by the guard 151.

If the delivery of envelops to the machine, that is to the tilting table, is to be effected automatically, the arrangement shown in Fig. 3 is employed. The machine works in this case almost wholly automatically, it being only necessary to effect the required change of the different kinds of stamps by shifting the feed rollers, and spools, or the moistener and plunger carrier, respectively.

A cam disk 90 (Fig. 3) on the shaft 2 actuates a bell-crank lever 91 which is pivoted on the shaft 4, a lever 94 mounted in the machine frame at 93 and having a pin contacting with said bell-crank lever. An axially slidable gripper rod 97 is guided in a sleeve 96 pivotally mounted on a bracket 95. Said gripper is provided with a pin 99 which is continuously pressed against the lever 94 by a spring 98 located within the sleeve 96, and is also pressed by a spring 100 engaging the sleeve 96 against one arm of a bell-crank lever 102 which is rotatable on a shaft 101. The bell-crank lever 102 in its turn engages a cam disk 103 on the shaft 2. Beneath the gripper is arranged a receptacle or magazine 104 for the unstamped envelops 108. At the bottom of the receptacle is arranged a plate 106 which is pressed upward by means of springs 105 and keeps the envelops or the like against projections 107 on the upper edge of the receptacle 104. By rotating the hand lever 3 the gripper 97 is depressed from its position shown in full lines, against the pile of envelops by the action of the cam disk 103 and bell-crank lever 102; whereupon the gripper is moved at first somewhat toward the left by means of the cam disk 90 and the levers 91 and 94, so that the upper envelop of the pile which is under the influence of the springs 105, is released from the projection 107 and turns slightly upward. On commencement of the backward movement of the gripper 97 the envelop is moved over this projection and is carried on to the tilting table 86 by means of the gripper, which is shown in its extreme right hand position by chain-dotted lines in Fig. 3.

Having now described our invention what we claim and desire to secure by Letters Patent of the United States is:—

1. In a machine for affixing sections of strips, such as stamps to envelops, the combination of a shaft, a plurality of cams thereon, means held in engagement with and actuated by said cams for feeding, moistening, severing, affixing and registering the stamps and for discharging the stamped envelops from the machine and for preventing the withdrawal of an envelop after the insertion of the envelop into the machine.

2. In a machine for affixing stamps to envelops the combination of a casing provided with an aperture, a guard-flap for said aperture, a rotatable cam shaft and means controlled by said shaft for feeding, moistening, severing, and affixing the stamps, for positively discharging the stamped envelops out of the machine, and for actuating the said guard flap to open and close said aperture.

3. In a machine for affixing stamps to envelops the combination of, a casing provided with an entrance aperture a guard-flap adapted to close said aperture, a cam shaft manually driven, a plurality of feeding devices for the stamps, said stamps being wound up in form of rolls, a plurality of registering devices, said feeding and registering devices being adapted to be controlled by said cam shaft and means under the control of the cam shaft for moistening, severing and affixing the stamps, for discharging the stamped envelops, and for actuating and locking the said guard-flap.

4. In a machine for affixing stamps to envelops the combination of, a casing provided with an entrance aperture, a guard-flap for said aperture, a cam shaft manually driven, a plurality of axially slidable feed rollers and actuating mechanism under the control of said cam shaft and adapted to be coupled with only one feed roller at a time, and means controlled by the cam shaft for moistening and affixing the stamps and for actuating the guard flap to open and close said aperture.

5. In a machine for affixing stamps to envelops the combination of, a casing, a cam shaft, mechanism under the control of said shaft, a plurality of axially slidable feed rollers for the stamps, the stamps being wound in form of rolls, actuating means for said rollers controlled by said mechanism, a plurality of registering devices for the stamps wound off their rolls, the registering devices corresponding in number to the number of the feed rollers, a means adapted to couple a registering device with the corresponding feed roller, and a moistening and an affixing device operated by said mechanism.

6. In a machine for affixing stamps to envelops the combination of, a cam shaft manually driven, a plunger, a moistening device, a plurality of feed rollers, means under the control of said cam shaft for actuating said plunger, moistening device and feed rollers, and a manually operatable device for rotating the feed rollers independently of said means and independently of each other.

7. In a machine for affixing stamps to envelops the combination, of a casing, a cam shaft mounted in the same, a feed roller, means under the control of the cam shaft for actuating said feed roller, a moistening device for the stamps, a plunger and an air suction device coöperating with said plunger.

8. In a machine for affixing stamps to envelops the combination of a casing, a rotatable cam shaft, means controlled by said shaft for feeding, moistening, severing, and affixing the stamps, means for discharging the stamped envelops, including a tilting table, gripping fingers adapted to project beyond the surface of the table and means for actuating the fingers when the table is tilted.

9. In a machine for affixing stamps to envelops the combination of a casing provided with an aperture, a rotatable cam shaft, means controlled by said shaft for feeding moistening, severing, and affixing stamps, means for discharging the stamped envelops, a guard flap for the aperture, means for bringing the guard flap in closing position, before the stamping operation is completed, and means for locking said guard in closing position until a predetermined number of stamps is affixed.

10. In a machine for affixing stamps to envelops the combination of a casing provided with an aperture, a rotatable cam shaft, means controlled by said cam shaft for feeding, moistening, severing, and affixing stamps, a tiltable table adjacent the aperture, a guard flap for the aperture, means for bringing said guard flap in closing position before the stamping operation is completed and means for interlocking said guard flap and said table, until a predetermined number of stamps is affixed.

11. In a machine for affixing stamps to envelops the combination of a casing provided with an aperture, a rotatable cam shaft, means controlled by said cam shaft for feeding, moistening, severing, and affixing stamps, a tiltable table adjacent said aperture, a guard flap for the aperture, means for bringing said guard flap in closing position before the stamping operation is completed, and a spring catch for locking said guard flap and said table in position, until a predetermined number of stamps is affixed.

12. In a machine for affixing stamps to envelops the combination of a casing provided with an aperture, a rotatable cam shaft, means controlled by said cam shaft for feeding, moistening, severing, and affixing stamps, means for discharging the stamped envelops including a tiltable table, a bar on said table, and releasable means adapted to be operatively connected with the bar for displacing the bar in transverse direction a distance corresponding to the width of a stamp after each affixing operation.

13. A machine for affixing adhesive stamps to articles, comprising a magazine, a stamp feeder to feed a stamp before a moistener, a moistener, a support, a stamp carrying plunger movably secured thereon, a cam for operating said plunger to remove a stamp from said feeder and moisten it.

14. A machine for affixing adhesive stamps to articles, comprising a magazine, a stamp feeder to feed a stamp before a moistener, a moistener, a support, a stamp carrying hollow plunger movably secured thereon, means for exhausting air from said plunger and a cam for operating said plunger to remove a stamp from the feeder and moisten it.

15. A machine for affixing adhesive stamps to packages, comprising a magazine, a stamp feeder to feed a stamp before a moistener, a moistener, a support, a stamp carrying plunger provided with an air passage therethrough movably secured on said support, means for creating a flow of air through said passage and a cam for operating said plunger to remove a stamp from the feeder and moisten it.

16. A machine for affixing adhesive stamps to packages, comprising a magazine, a stamp feeder to feed a stamp before a moistener, a moistener, a support, a stamp carrying plunger provided with an air passage therethrough movably secured on said support, means for creating a flow of air through said passage and a cam for operating said plunger to remove a stamp from the feeder and moisten it, and means to affix it to a package.

In testimony whereof we have signed our names to this specification in the presence of two subscribing witnesses.

ISAC MICHEL.
RUDOLF STEIN.

Witnesses:
   JEAN GRUND,
   CARL GRUND.

---

Copies of this patent may be obtained for five cents each, by addressing the "Commissioner of Patents, Washington, D. C."